United States Patent
Salm et al.

(10) Patent No.: US 9,856,734 B2
(45) Date of Patent: Jan. 2, 2018

(54) ADAPTIVE MACHINING TURBOMACHINE BLADE SHROUD HARD FACE

(71) Applicant: General Electric Company, Schenectady, NY (US)

(72) Inventors: Jacob Andrew Salm, Mauldin, SC (US); Mark Carmine Bellino, Greenville, SC (US); James Ryan Connor, Greenville, SC (US); Gareth William David Lewis, Greenville, SC (US); Keith Alan Lord, Taylors, SC (US)

(73) Assignee: General Electric Company, Schenectady, NY (US)

( * ) Notice: Subject to any disclaimer, the term of this patent is extended or adjusted under 35 U.S.C. 154(b) by 251 days.

(21) Appl. No.: 14/824,566

(22) Filed: Aug. 12, 2015

(65) Prior Publication Data

US 2017/0044900 A1    Feb. 16, 2017

(51) Int. Cl.
*F01D 5/00* (2006.01)
*G05B 19/4099* (2006.01)
(Continued)

(52) U.S. Cl.
CPC ............. *F01D 5/005* (2013.01); *G05B 15/02* (2013.01); *G05B 19/4099* (2013.01);
(Continued)

(58) Field of Classification Search
CPC ....... G05B 15/02; G05B 19/4099; B23P 6/00; B23P 9/04; F01D 5/005
See application file for complete search history.

(56) References Cited

U.S. PATENT DOCUMENTS 6,969,821 B2 * 11/2005 Mika .................. B23P 6/002
219/121.83
2011/0087352 A1    4/2011 Krause
(Continued)

FOREIGN PATENT DOCUMENTS

DE   10 2007 019951 A1   10/2008
WO      2008/131723 A1   11/2008

OTHER PUBLICATIONS

Extended European Search Report and Opinion issued in connection with corresponding EP Application No. 16183981.6 dated Dec. 21, 2016.

*Primary Examiner* — Vincent Tran
(74) *Attorney, Agent, or Firm* — Ernest G. Cusick; Hoffman Warnick LLC

(57) ABSTRACT

A system for adaptively machining a shroud of a blade used in a turbomachine is provided. The system may include a computer system including a module(s) configured to: extract geometric location data from a 3D model of the shroud after use in the turbomachine, the 3D model created by digitizing using a digitizing device. The geometric location data includes geometric location data of a hard face plane of the shroud exposed to wear during turbomachine operation and of a non-worn surface adjacent to the hard face plane substantially unexposed to wear during turbomachine operation. Comparing the geometric location data of the non-worn surface from the three-dimensional model to a manufacturing model of the blade determines a change in position of the non-worn surface from use of the blade in the turbomachine. The change in position is used to modify a machining instruction used by a machining device to repair the hard face plane.

19 Claims, 5 Drawing Sheets

(51) Int. Cl.
*G05B 15/02* (2006.01)
*B23P 6/00* (2006.01)

(52) U.S. Cl.
CPC .......... *B23P 6/007* (2013.01); *F05D 2220/30* (2013.01); *F05D 2230/30* (2013.01); *F05D 2230/80* (2013.01); *G05B 2219/35128* (2013.01); *G05B 2219/45147* (2013.01)

(56) References Cited

U.S. PATENT DOCUMENTS

2011/0264413 A1* 10/2011 Stankowski ............ B23P 6/005
　　　　　　　　　　　　　　　　　　　　　　　703/1
2014/0003948 A1　　1/2014 Dubs et al.
2014/0325841 A1* 11/2014 Derrien ................... B23P 6/002
　　　　　　　　　　　　　　　　　　　　　　　29/889.7

\* cited by examiner

ADAPTIVE MACHINING TURBOMACHINE BLADE SHROUD HARD FACE

BACKGROUND OF THE INVENTION

The disclosure relates generally to machining, and more particularly, to adaptive machining of turbomachine blade shroud hard faces.

In a turbomachine, blades are used to generate power from a flow of a working fluid. In particular, a number of blades may be coupled to a rotor to impart rotational motion to the rotor from a flow of a working fluid thereover. Turbomachine blades are initially shaped based on ideal manufacturing models that create highly efficient blades. Each turbomachine blade includes a number of intricate turns and mating surfaces to allow for the blades to collectively perform their function. For example, each blade may include a shroud at an outer end thereof that includes a hard face that engages with a mating hard surface of an adjacent blade's shroud. Hard faces are parts of the shroud that include wear material and come into contact during operation to dampen vibration. During turbine engine operation, shrouded turbine blades are subject to high amounts of distortion and twist. A contact gap between two adjacent blades is critical to ensure bucket engagement during turbomachine operation. As the turbomachine blades wear, the contact gap between two adjacent blades increases resulting in inadequate blade engagement. Consequently, turbomachine blade hard faces often require restoration during periodic repair processes.

During the restoration process, blades are machined in an attempt to return them to their manufacturing model that typically represents a nominal condition (sometimes referred to as 'dovetail datum structure'). A challenge in restoring the blades to the modeled state is that the combination of the high amount distortion and twist positions the hard faces such that they are no longer where the nominal model predicts. Machining the hard faces on a blade based on the nominal part dimensions is inadequate because it may require unnecessary machining removal on one hard face of the shroud and/or unnecessary addition of material on another hard face of the shroud for highly distorted parts. The resulting inaccurate machining may impact part life.

BRIEF DESCRIPTION OF THE INVENTION

A first aspect of the disclosure provides a computerized method of adaptively machining a shroud of a blade used in a turbomachine, the method comprising: in a computer system: extracting a geometric location data from a three-dimensional model of the shroud after use in the turbomachine, the three-dimensional model created by digitizing using a digitizing device, the geometric location data including geometric location data of a hard face plane of the shroud exposed to wear during turbomachine operation and of a non-worn surface adjacent to the hard face plane substantially unexposed to wear during turbomachine operation; comparing the geometric location data of the non-worn surface from the three-dimensional model to a manufacturing model of the blade to determine a change in position of the non-worn surface from use of the blade in the turbomachine; and using the change in position of the non-worn surface to modify a machining instruction used by a machining device to repair the hard face plane.

A second aspect of the disclosure provides a system for adaptively machining a shroud of a blade used in a turbomachine, the system comprising: a computer system including at least one module configured to perform the following steps: extracting a geometric location data from a three-dimensional model of the shroud after use in the turbomachine, the three-dimensional model created by digitizing using a digitizing device, the geometric location data including geometric location data of a hard face plane of the shroud exposed to wear during turbomachine operation and of a non-worn surface adjacent to the hard face plane substantially unexposed to wear during turbomachine operation; comparing the geometric location data of the non-worn surface from the three-dimensional model to a manufacturing model of the blade to determine a change in position of the non-worn surface from use of the blade in the turbomachine; and using the change in position of the non-worn surface to modify a machining instruction used by a machining device to repair the hard face plane.

A third aspect of the disclosure provides a machining system for adaptively machining a shroud of a blade used in a turbomachine, the system comprising: a computer system including at least one module configured to perform the following steps: extracting a geometric location data from a three-dimensional model of the shroud after use in the turbomachine, the three-dimensional model created by digitizing using a digitizing device, the geometric location data including geometric location data of a hard face plane of the shroud exposed to wear during turbomachine operation and of a non-worn surface adjacent to the hard face plane substantially unexposed to wear during turbomachine operation, comparing the geometric location data of the non-worn surface from the three-dimensional model to a manufacturing model of the blade to determine a change in position of the non-worn surface from use of the blade in the turbomachine, and using the change in position of the non-worn surface to modify a machining instruction used by a machining device to repair the hard face plane; and at least one machining device operatively coupled to the computer system and configured to repair the hard face plane through at least one of additive and subtractive processes.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides for adaptively machining a shroud of a blade used in a turbomachine, and in particular, a hard face of a shroud. Embodiments of the invention may include a computerized method and a system for adaptively machining a shroud of a blade used in a turbomachine, and a machining system including such a system. As will be explained, the adaptive machining includes extracting a geometric location data for at least a non-worn surface adjacent a hard face plane from a three-dimensional model of the shroud after use in the turbomachine, and comparing the geometric location data of the non-worn surface from the three-dimensional model to a manufacturing model of the blade to determine a change in position of the non-worn surface from use of the blade in the turbomachine. The change in position of the non-worn surface is used to modify a machining instruction used by a machining device to repair the hard face plane. In this fashion, a change in position of a structure such as the non-worn surface adjacent to a hard face plane that does not undergo wear can be used to more accurately determine a change in position of the hard face plane that can be used to more accurately repair the hard face plane.

Figure 1:
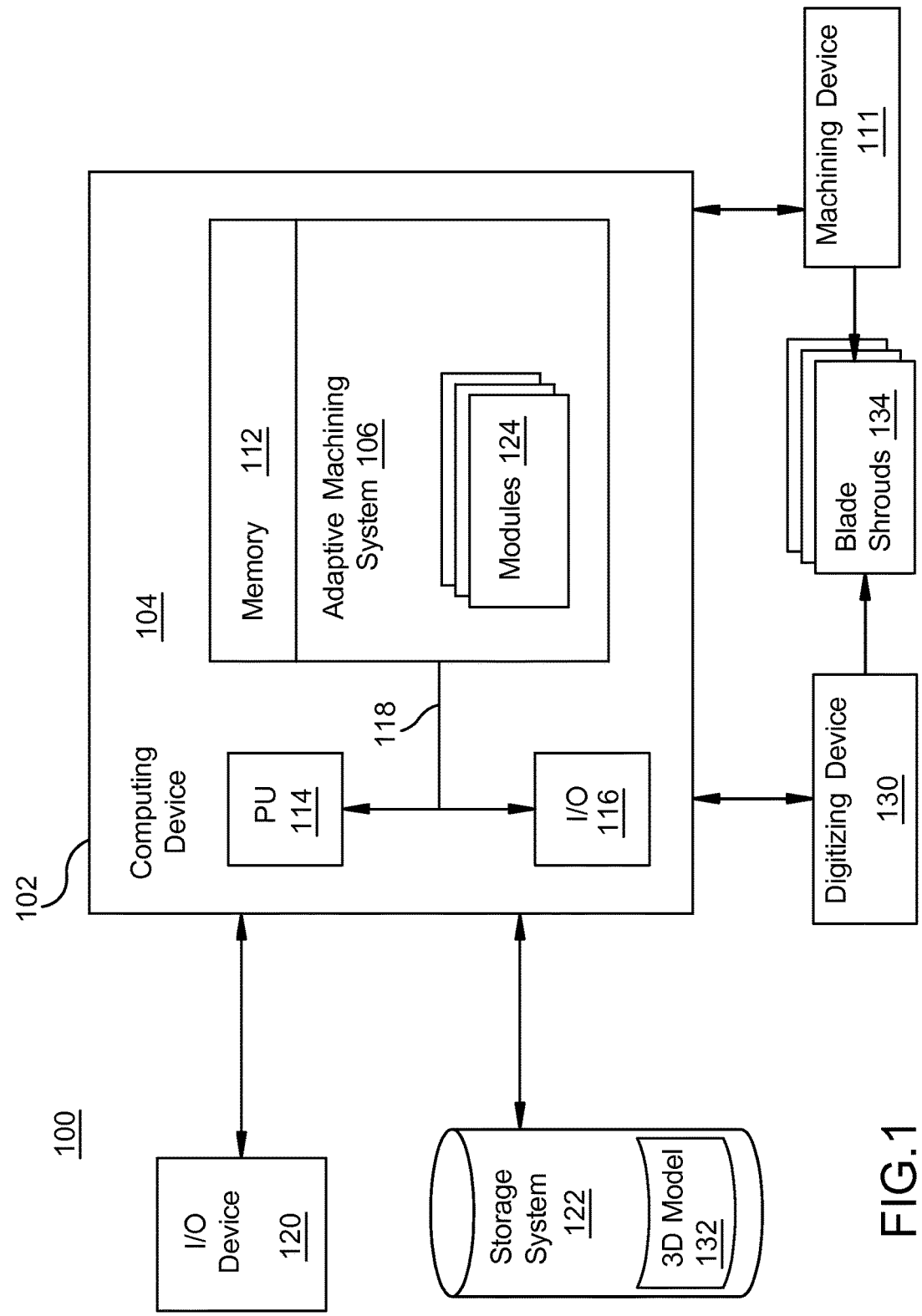
FIG. 1 is a block diagram of an illustrative environment for adaptively machining a shroud of a blade used in a turbomachine according to embodiments of the disclosure.

Referring now to FIG. 1, a block diagram of an illustrative environment 100 for adaptively machining a shroud of a blade used in a turbomachine according to embodiments of the disclosure is shown. To this extent, environment 100 includes a computer infrastructure 102 that can perform the various process steps described herein for adaptively machining a shroud of a blade used in a turbomachine. In particular, computer infrastructure 102 is shown including a computing device or system 104 that comprises an adaptive machining system 106, which enables computing device 104 to adaptively machine a shroud of a blade used in a turbomachine in conjunction with a machining device 111 by performing the process steps of the disclosure.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as adaptive machining system 106, that is stored in memory 112 and/or storage system 122. While executing computer program code, processor 114 can read and/or write data, such as digitized three-dimensional models 132 of a shroud of a turbomachine blade, to/from memory 112, storage system 122, and/or I/O interface 116. Bus 118 provides a communications link between each of the components in computing device 104. I/O device 118 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In any event, computing device 104 can comprise any general purpose computing article of manufacture capable of executing computer program code installed by a user (e.g., a personal computer, server, handheld device, etc.). However, it is understood that computing device 104 and adaptive machining system 106 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 may comprise two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, adaptive machining system 106 enables computing infrastructure 102 to adaptively machine a shroud of a blade used in a turbomachine in conjunction with machining device 111. To this extent, adaptive machining system 106 is shown including a number of modules 124. Operation of each of these modules is generally discussed herein. However, it is understood that some of the various systems shown in FIG. 1 can be implemented independently, combined, and/or stored in memory for one or more separate computing devices that are included in computer infrastructure 102. In particular, while adaptive machining system 106 is illustrated apart from machining device 111, it may be an integral part of a control system of machining device 111. Further, it is understood that some of the systems and/or functionality may not be implemented, or additional systems and/or functionality may be included as part of environment 100.

Environment 100 may also include a digitizing device 130 for creating a three-dimensional (3D) model 132 (shown in storage system 122) of a shroud 134 of one more blades, e.g., of a blade stage, by digitizing. As used herein, "digitizing" includes any now known or later developed method of creating three-dimensional coordinates of at least a portion of a part. Digitizing device 130 may include a mechanical apparatus such as those that employ a tracing tip, or may include an optical system such as those that employ a laser scanner or other structured light. In any event, the digitizing creates a large number of coordinates in a three-dimensional space such that 3D model 132 takes the form of a mesh on a display. Each shroud 134 may be digitized in a disassembled state apart from a respective rotor wheel, and independent of other shrouds. Any appropriate fixture may be employed for supporting and holding each shroud in a uniform manner during the digitizing. While FIG. 1 is illustrated including a digitizing device 130 for digitizing shrouds 134, it is understood that embodiments of the invention may include "obtaining" a 3D model 132 of a shroud of each blade of the blade stage created by digitizing using a digitizing device. Consequently, it is understood that embodiments of the method may employ a 3D model 132 that is not directly generated but obtained from a third party that performs the digitization. When the data is not generated by digitizing device 130 directly, it is understood that another system/component can be implemented apart from the system/component shown, which generates 3D model 132 and provides it to adaptive machining system 106 or stores the data for access by the system. In this regard, various systems and components as described may "obtain" data such as 3D model 132 of a shroud, etc. It is understood that the corresponding data can be obtained using any solution. For example, the corresponding system/component can retrieve the data from one or more data stores (e.g., a database), or receive the data from another system/component, and/or the like.

Figure 2:
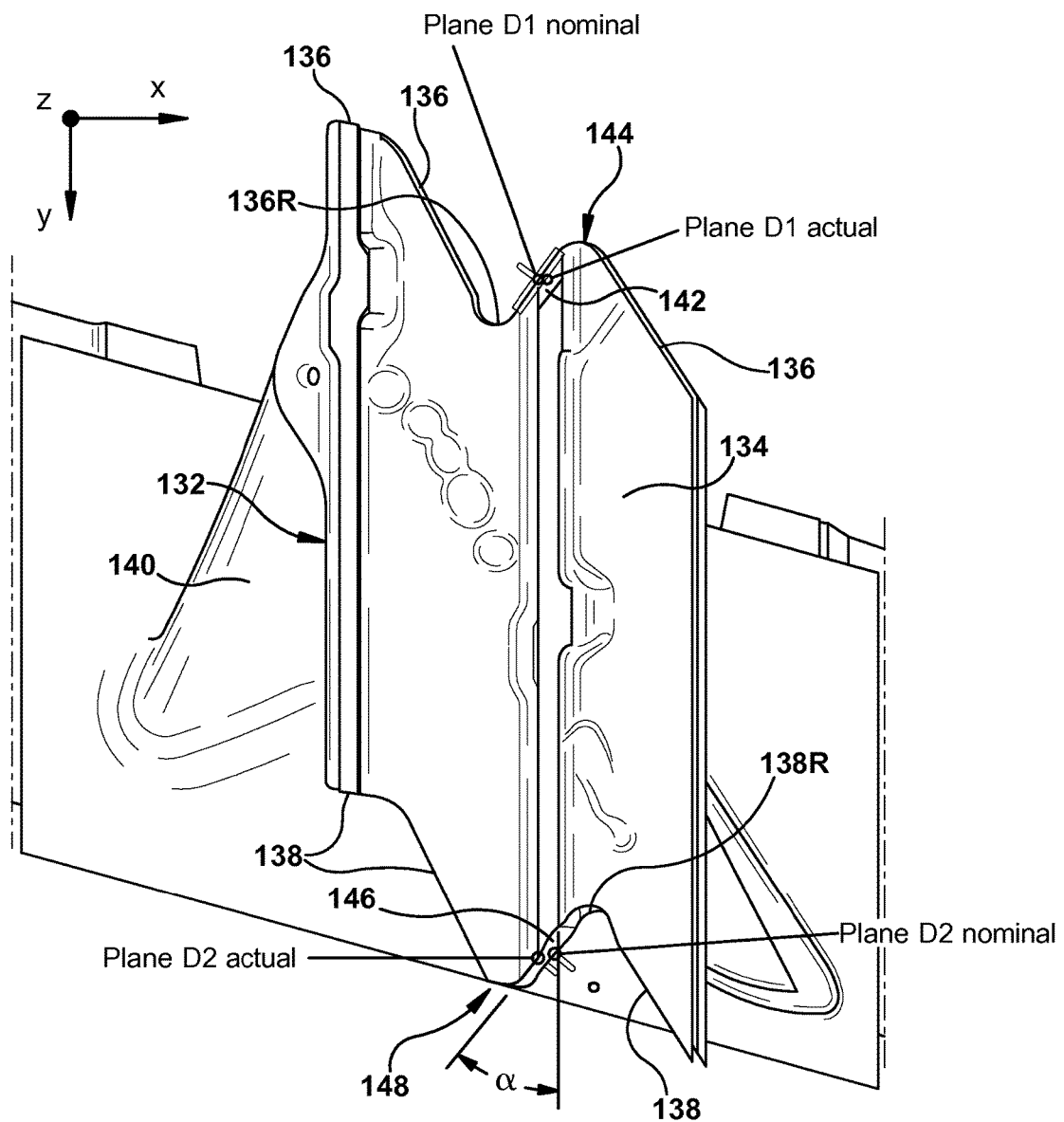
FIG. 2 is an illustrative three-dimensional model of a shroud of a blade according to embodiments of the disclosure.

Referring to FIG. 2, an illustrative 3D model 132 of shroud 134 of a blade 140 is illustrated. 3D model 132 illustrates a first hard face plane D1 of a hard face 142 at a first circumferential end 144 of shroud 134, and a second hard face plane D2 of a second hard face 146 at an opposing, second circumferential end 148. As understood in the art, blade 140 is slid into a rotor wheel in an axial direction x that parallels a rotor axis (not shown), and adjacent blades 140 mate along hard faces 142 and 146. 3D model 132, as noted, may be obtained using digitizing device 130 (FIG. 1) that may include a mechanical apparatus such as those that employ a tracing tip, or may include an optical system such as those that employ a laser scanner or other structured light. FIG. 2 shows a rendering from a digitizing device in the form of a structured light device created by a 3D light scanner such as but not limited to: an ATOS industrial 3D scanner available from GOM mbH, or a Steinbichler COMET L3D scanner available from Q-Plus Labs.

Continuing with FIG. 2, adaptive machining system 106 (FIG. 1) extracts geometric location data from 3D model 132 of shroud 134 after use in the turbomachine. The geometric location data may include data of: a hard face plane(s) D1, D2 of shroud 134 exposed to wear during turbomachine operation and of a non-worn surface 136, 138 adjacent to hard face plane(s) D1, D2, respectively. A "non-worn surface(s)" 136, 138 may include any surface adjacent to (next to or in the vicinity of) hard face planes(s) D1, D2 that is not exposed to surface-to-surface wear, as are the hard face planes, and that is originally machined to similarly high tolerances as the hard face plane(s) D1, D2, e.g., +/−0.015 millimeters (0.0006 inches). Each non-worn surface 136, 138 is substantially unexposed to wear during turbomachine operation compared to hard face plane(s) D1, D2 which may wear, for example, 0.127-0.508 millimeters (0.005-0.020 inches). That is, each non-worn surface 136, 138 experiences the general distortion, twist and environmental wear of shroud 134, but no direct contact with other structure is present as with hard face planes D1, D2. In one embodiment, the non-worn surface 136, 138 may include a radius 136R and/or 138R adjacent to hard face plane(s) D1, D2, respectively. Each radius 136R, 138R is substantially unexposed to wear during turbomachine operation, but experiences the general distortion, twist and environmental wear of shroud 134. Each radius 136R, 138R does not have direct contact with other structure as is present with hard face planes D1, D2. In other embodiments, surfaces 136, 138 apart from radii 136R, 138R may be used. (The leftmost surfaces 136 in FIG. 2 may extend out of the page). The extracting of the geometric location data may include, for example, identifying an x, y and z coordinate of each non-worn surface 136, 138 and hard face plane D1, D2 in space. That is, the extracting may include calculating a local best fit of shroud 134 using any now known or later developed 3D data analysis technique. In FIG. 2, the x axis extends parallel to a rotor axis (not shown), the y axis extends in a first radial direction laterally from the rotor axis, and the z axis extends in a second radial direction vertically from the rotor axis. Consequently, each non-worn surface 136, 138 and hard face plane D1, D2 includes a number of data points in three-dimensional space such that a best fit plane can be ascertained. As each blade 134 is fixed in a holder or support in an identical fashion to every other blade during digitizing, the x, y, z coordinates share a common origin as a reference. The extracting may also include identifying a compound angular orientation a of each hard face plane D1, D2 in space (only one shown). The extraction thus provides geometric location data of each non-worn 136, 138 and each hard face plane D1, D2 relative to a common reference point.

Figure 3:
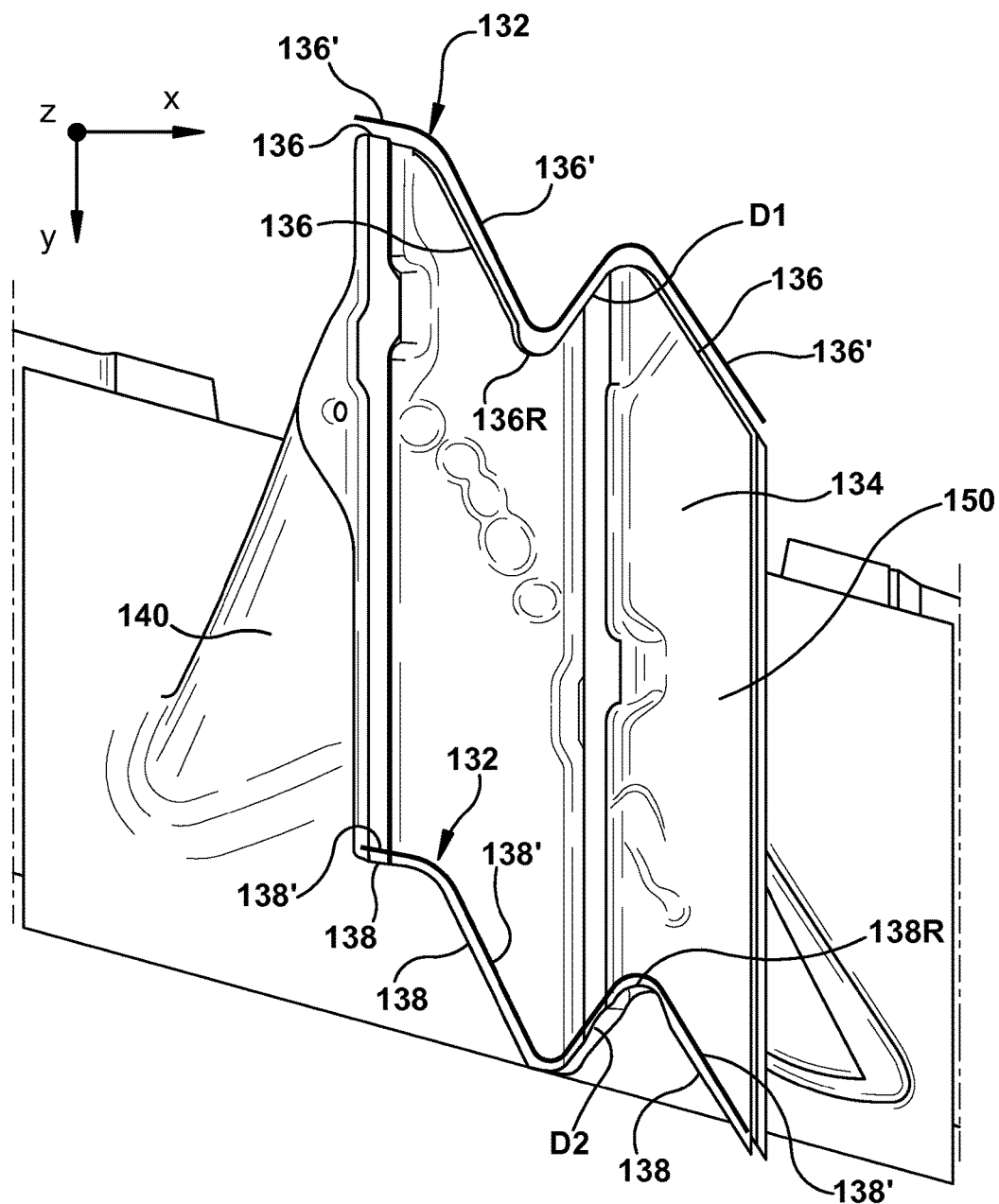
FIGS. 3 and 4 show two example 3D models of FIG. 2 superimposed with a manufacturing model according to embodiments of the disclosure.
Figure 4:
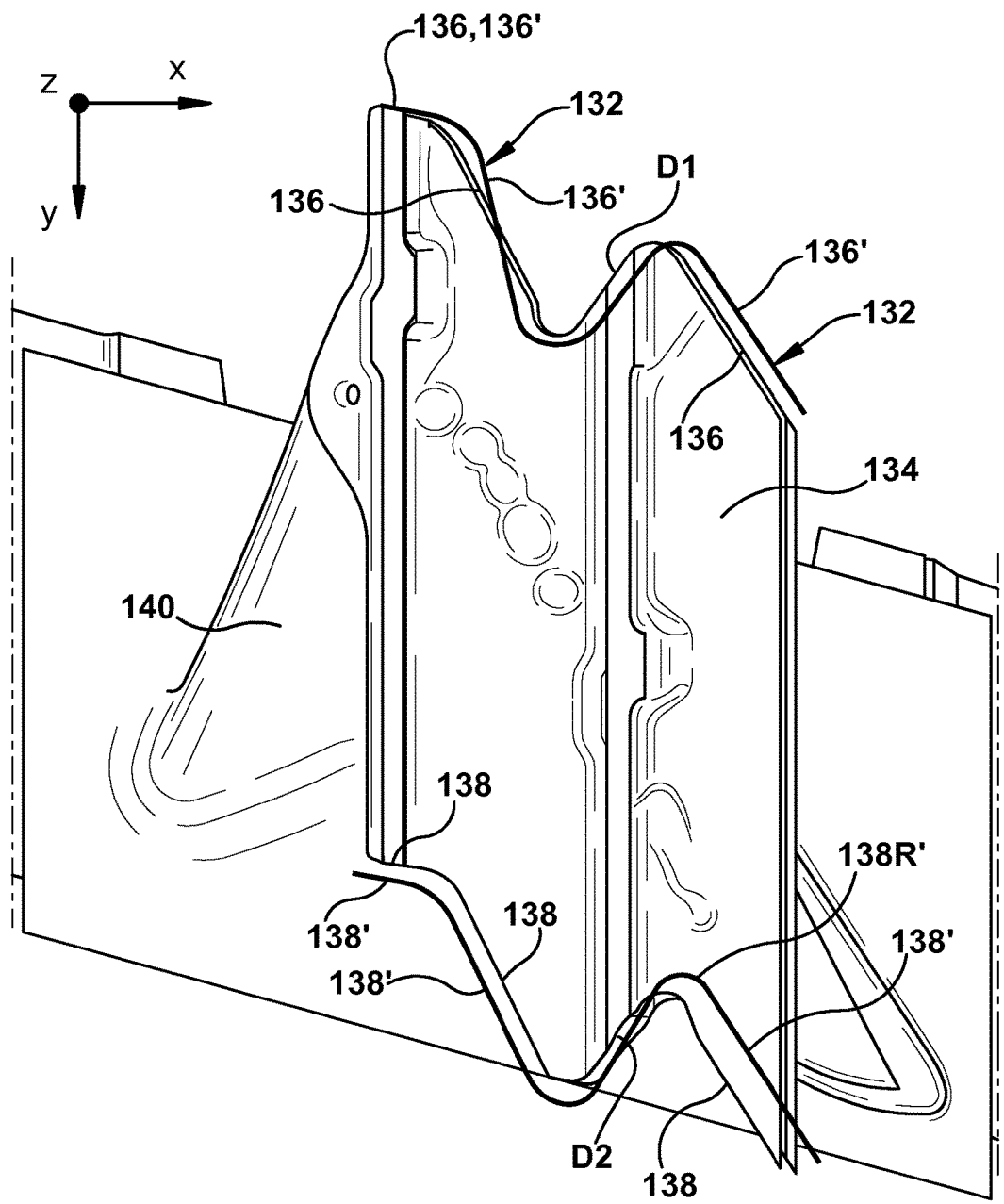

Adaptive machining system 106 (FIG. 1) compares the geometric location data of non-worn surface 136 and/or 138 from a 3D model 132 (FIG. 2) to a manufacturing model 150 of the blade to determine a change in position of non-worn surface 136 and/or 138 from use of the blade in the turbomachine. To illustrate the comparison, FIGS. 3 and 4 show non-worn surfaces 136, 138 (and in particular radius 138R) from manufacturing (3D) model 150 in an initial, as-manufactured position superimposed with worn surface(s) 136', 138' (and in particular radius 138R') in a 3D model 132 (not all shown—see offset lines from model 150), created after use of the blade, in a second, changed position. FIG. 3 shows a simple axial displacement (along axis y) and FIG. 4 shows a more complex change in position along many axes x, y and/or z. While FIGS. 3 and 4 show a couple of examples, the change in position determined by adaptive manufacturing system 106 through the comparison can include practically any geometric change, e.g., radial displacement RD (radially inward/outward from the turbomachine axis), circumferential lateral displacement CLD (about the turbomachine axis), axial displacement AD (along the turbomachine axis) and/or any angular displacement such as compound angle α in FIG. 2. In one embodiment, the change in position may include a radial displacement RD relative to an axis of the turbomachine and a circumferential displacement CD about the axis of the turbomachine. In addition, the change in position determination can be carried out for each non-worn surface 136, 138 change in position relative to its own respective initial position, thus providing very precise machining instruction for each hard face plane D1, D2. In another embodiment, where such precision may not be necessary, the change in position may be based on an average of a plurality of change of position of a plurality of radii across a plurality of blades. In this fashion, not every shroud 134 may need to be digitized. Here, the machining instruction may be based on the average of the change of position of the plurality of radii. While FIGS. 3 and 4 illustrate superposition of two 3D models, it is emphasized that adaptive machining system 106 need not create such an image(s), and can simply calculate the displacements by differencing common location components, e.g., the two sets of x, y, z positions of a particular point on a non-worn surface 136, 138.

Figure 6:
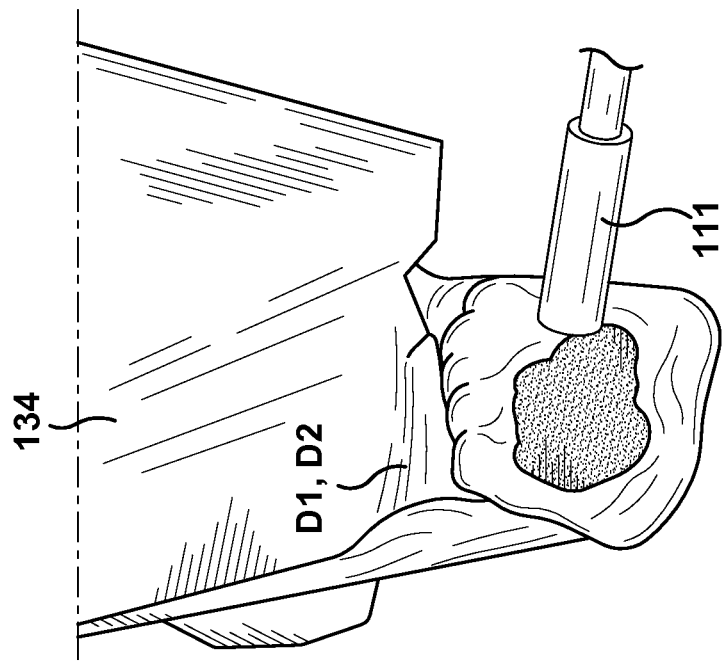
FIG. 6 shows an enlarged schematic view of additive machining according to embodiments of the disclosure.
Figure 5:
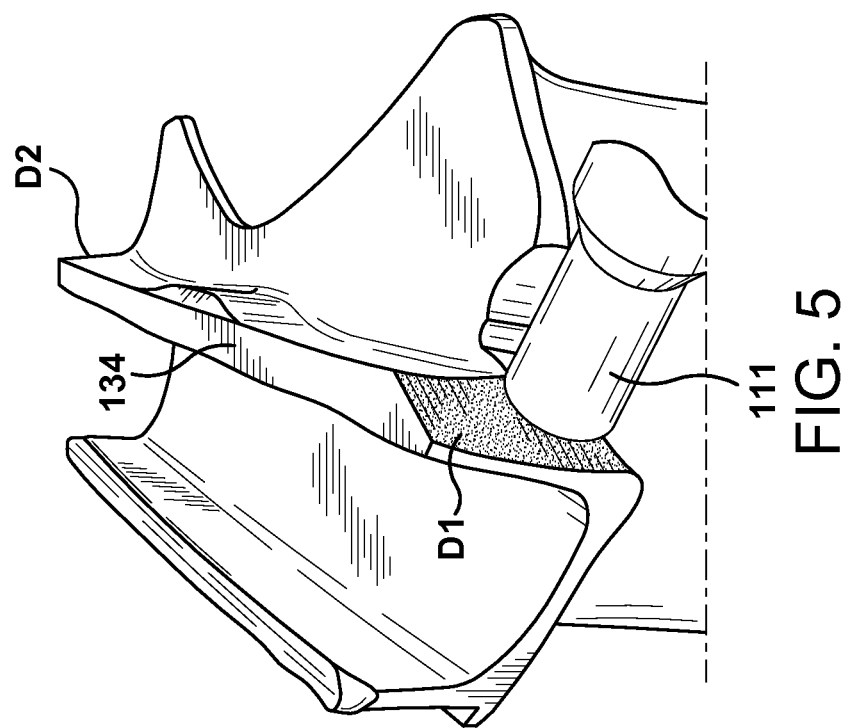
FIG. 5 shows an enlarged schematic view of subtractive machining according to embodiments of the disclosure.

Once a change in position of non-worn surface 136 and/or 138 are determined, adaptive machining system 106 can use the change in position of the non-worn surface to modify a machining instruction used by machining device 111 to repair hard face plane D1 and/or D2. As understood in the art, machining device 111 may be provided with a large number of instructions (referred to as "g-code") for precisely machining hard face planes D1, D2 of the blades during repair. The instructions provide direction to machining device 111 to subtract material through conventional machining techniques such as grinding, etc., as shown in FIG. 5, and/or add material through deposition, welding, etc., as shown in FIG. 6. Machining device 111 may include any now known or later developed device capable of computer controlled additive and/or subtractive machining processes such as but not limited to: thermal spray, cold spray, and/or laser cladding/welding, etc., in terms of additive machining, and milling, grinding, EDM and/or wet jetting, etc., in terms of subtractive machining.

The above-described processes can be repeated for each of a pair of hard faces D1, D2 on a shroud 134 of a blade. Also, the processes can be repeated for a plurality of blades such that a number of hard face planes within a blade stage can be more accurately repaired.

Adaptive machining system 106 provides for machining each component uniquely or based on a set average. In any event, based on the various displacements obtainable through determination of the change in position, a more accurate repair can be made. System 106 is applicable to all shrouded turbomachine blades that are subject to distortions due to engine run conditions, and can reduce and/or eliminate concerns of machining into portions, e.g., a z-form fillet radii, that may reduce part life. Further, system 106 reduces the risk of parts seeing additional fallout due to creep and/or cracking, and reduces repair costs by eliminating unnecessary scrap and/or rework caused by machining parts to a nominal modeled condition.

As will be appreciated by one skilled in the art, embodiments of the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted may occur out of the order noted. For example, functions may be executed substantially concurrently, or may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The foregoing drawings show some of the processing associated according to several embodiments of this disclosure. In this regard, each drawing within a flow of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computerized method of adaptively machining a shroud of a blade used in a turbomachine, the method comprising:
   in a computer system:
   extracting a geometric location data from a three-dimensional model of the shroud after use in the turbomachine, the three-dimensional model created by digitizing using a digitizing device, and the geometric location data including geometric location data of:
      a hard face plane of the shroud exposed to wear during turbomachine operation, the hard face plane of the shroud includes a portion of the shroud that directly contacts a distinct, adjacent shroud of the turbomachine during operation; and
      a non-worn surface adjacent to the hard face plane substantially unexposed to wear during turbomachine operation, the non-worn surface of the shroud not contacting the distinct, adjacent shroud of the turbo machine during operation;
   comparing the geometric location data of the non-worn surface from the three-dimensional model to a manufacturing model of the blade to determine a change in position of the non-worn surface from use of the blade in the turbomachine; and
   using the change in position of the non-worn surface to modify a machining instruction used by a machining device to repair the hard face plane.

2. The method of claim 1, wherein the change in position includes a radial displacement relative to an axis of the turbomachine and a circumferential displacement about the axis of the turbomachine.

3. The method of claim 1, wherein the non-worn surface includes a radius adjacent to the hard face plane.

4. The method of claim 1, wherein the change in position includes an average of a plurality of change of position of a plurality of radii across a plurality of blades, and the machining instruction is based on the average of the change of position of the plurality of radii.

5. The method of claim 1, further comprising repeating the extracting, comparing and using for each of a pair of hard faces on a shroud of a blade.

6. The method of claim 1, further comprising repeating the extracting, comparing and using for a plurality of blades.

7. The method of claim 1, wherein the repair of the hard face includes using at least one machining device operatively coupled to the computer system and configured to repair the hard face plane through at least one of additive and subtractive processes.

8. A system for adaptively machining a shroud of a blade used in a turbomachine, the system comprising:
   a computer system including at least one module configured to perform the following steps:
   extracting a geometric location data from a three-dimensional model of the shroud after use in the turbomachine, the three-dimensional model created by digitizing using a digitizing device, the geometric location data including geometric location data of a hard face plane of the shroud exposed to wear during turbomachine operation and of a non-worn surface adjacent to the hard face plane substantially unexposed to wear during turbomachine operation;
   comparing the geometric location data of the non-worn surface from the three-dimensional model to a manufacturing model of the blade to determine a change in position of the non-worn surface from use of the blade in the turbomachine,
   wherein the change in position includes an average of a plurality of change of position of a plurality of radii across a plurality of blades; and
   using the change in position of the non-worn surface to modify a machining instruction used by a machining device to repair the hard face plane,
   wherein the machining instruction is based on the average of the change of position of the plurality of radii.

9. The system of claim 8, wherein the change in position includes a radial displacement relative to an axis of the turbomachine and a circumferential displacement about the axis of the turbomachine.

10. The system of claim 8, wherein the non-worn surface includes a radius adjacent to the hard face plane.

11. The system of claim 8, further comprising repeating the extracting, comparing and using for each of a pair of hard faces on a shroud of a blade.

12. The system of claim 8, further comprising repeating the extracting, comparing and using for a plurality of blades.

13. The system of claim 8, further comprising at least one machining device operatively coupled to the computer system and configured to repair the hard face plane through at least one of additive and subtractive processes.

14. A machining system for adaptively machining a shroud of a blade used in a turbomachine, the system comprising:
 a computer system including at least one module configured to perform the following steps:
  extracting a geometric location data from a three-dimensional model of the shroud after use in the turbomachine, the three-dimensional model created by digitizing using a digitizing device, the geometric location data including geometric location data of a hard face plane of the shroud exposed to wear during turbomachine operation and of a non-worn surface adjacent to the hard face plane substantially unexposed to wear during turbomachine operation;
  comparing the geometric location data of the non-worn surface from the three-dimensional model to a manufacturing model of the blade to determine a change in position of the non-worn surface from use of the blade in the turbomachine,
  wherein the change in position includes an average of a plurality of change across a plurality of blades;
  using the change in position of the non-worn surface to modify a machining instruction used by a machining device to repair the hard face plane,
  wherein the machining instruction is based on the average of the change of position of the plurality of blades; and
 at least one machining device operatively coupled to the computer system and configured to repair the hard face plane through at least one of additive and subtractive processes.

15. The system of claim 14, wherein the change in position includes a radial displacement relative to an axis of the turbomachine and a circumferential displacement about the axis of the turbomachine.

16. The system of claim 14, wherein the non-worn surface includes a radius adjacent to the hard face plane.

17. The system of claim 14, wherein the average of the change of position of the plurality of blades includes an average of a plurality of change of position of a plurality of radii across the plurality of blades.

18. The system of claim 14, further comprising repeating the extracting, comparing and using for each of a pair of hard faces on a shroud of a blade.

19. The system of claim 14, further comprising repeating the extracting, comparing and using for a plurality of blades.

* * * * *